(12) United States Patent
Zhang et al.

(10) Patent No.: US 12,499,585 B2
(45) Date of Patent: Dec. 16, 2025

(54) METHODS OF SAMPLING-BASED OBJECTIVE QUALITY ASSESSMENT FOR MESHES

(71) Applicant: TENCENT AMERICA LLC, Palo Alto, CA (US)

(72) Inventors: Xiang Zhang, Sunnyvale, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 304 days.

(21) Appl. No.: 18/190,610

(22) Filed: Mar. 27, 2023

(65) Prior Publication Data
US 2023/0360275 A1 Nov. 9, 2023

Related U.S. Application Data

(60) Provisional application No. 63/338,342, filed on May 4, 2022.

(51) Int. Cl.
*G06T 9/00* (2006.01)
*G06T 7/00* (2017.01)

(52) U.S. Cl.
CPC ............ *G06T 9/001* (2013.01); *G06T 7/0002* (2013.01)

(58) Field of Classification Search
CPC .. C11D 1/22; C11D 1/29; C11D 1/722; C11D 1/831; C11D 17/042; C11D 17/045; C11D 2111/12; C11D 3/0068; C11D 3/0084; C11D 3/30; C11D 3/3723; D06M 13/005; G06T 7/0002; G06T 9/001
See application file for complete search history.

(56) References Cited

U.S. PATENT DOCUMENTS

| | | | |
|---|---|---|---|
| 10,192,353 B1* | 1/2019 | Chou | G06T 17/00 |
| 2002/0190988 A1 | 12/2002 | Maillot et al. | |
| 2014/0092439 A1* | 4/2014 | Krig | H04N 13/161 |
| | | | 348/43 |

(Continued)

OTHER PUBLICATIONS

Written Opinion dated Jun. 15, 2023 issued by the International Searching Authority in International Application No. PCT/US 23/16535.

(Continued)

*Primary Examiner* — Ming Wu
(74) *Attorney, Agent, or Firm* — Sughrue Mion, PLLC

(57) ABSTRACT

A method including receiving, at an encoder, a first original polygonal mesh and a second distorted polygonal mesh, the first original polygonal mesh being an original polygonal mesh and the second polygonal mesh being a distorted polygonal mesh; converting the first polygonal mesh and the second polygonal mesh into two or more triangle meshes by subdividing the plurality of polygon faces of each of the first polygonal mesh and the second polygonal mesh into a plurality of triangle faces; sampling a plurality of points on each of the plurality of triangle faces from both the first and the second polygonal meshes; generating at least a first sampled point cloud for one of the first or the second polygonal mesh using the sampled plurality of points; and computing a geometry and attribute distortion profile between the first and the second polygonal meshes based on at least the first sampled point cloud.

20 Claims, 11 Drawing Sheets

(56) References Cited

U.S. PATENT DOCUMENTS

| | | |
|---|---|---|
| 2014/0139525 A1 | 5/2014 | Grenfell |
| 2017/0365069 A1* | 12/2017 | Dupont ................. G06T 17/205 |
| 2018/0165836 A1* | 6/2018 | Curington ............... G06T 9/001 |
| 2018/0342083 A1* | 11/2018 | Onno ........................ G06T 9/20 |
| 2019/0197786 A1* | 6/2019 | Molyneaux ............ G06V 20/20 |
| 2019/0268612 A1 | 8/2019 | Fukuyasu et al. |
| 2019/0371007 A1* | 12/2019 | Elgersma ................ G06T 17/05 |
| 2021/0200916 A1 | 7/2021 | Roberts et al. |
| 2022/0036651 A1 | 2/2022 | Davidson et al. |

OTHER PUBLICATIONS

International Search Report dated Jun. 15, 2023 issued by the International Searching Authority in International Application No. PCT/US 23/16535.

Extended EP Search Report issued Jul. 28, 2025 in EP Application No. 23786170.3.

Metrics for Dynamic Mesh Coding, 136. MPEG Meeting; 20211011-20211015; Online; (Motion Picture Expert Group or ISO/IEC JTC1/SC29/WG11), 27 pages Cited in EP Search Report issued Jul. 28, 2025.

\* cited by examiner

METHODS OF SAMPLING-BASED OBJECTIVE QUALITY ASSESSMENT FOR MESHES

CROSS-REFERENCE TO RELATED APPLICATION

This application claims priority from U.S. Provisional Application No. 63/338,342, filed on May 4, 2022, the disclosure of which is incorporated herein by reference in its entirety.

TECHNICAL FIELD

This disclosure is directed to a set of advanced video coding technologies. More specifically, the present disclosure is directed sampling-based objective quality assessment methods for meshes.

BACKGROUND

In the MPEG CFP for dynamic mesh compression, it is proposed to use the point-based sampling metric to evaluate the quality of distorted triangle meshes.

There are several limitations in the current point-based quality evaluation method. First, it only applies to triangle meshes without the generality of handling various polygonal meshes, where each face of the mesh can have more than three edges, e.g., the mesh with quadrangle faces. Second, the sampling method from triangle mesh to point cloud may be sub-optimal. Third, computing the quality metrics from two converted point clouds may be less accurate in terms of the correlation to the subjective quality and less efficient in terms of computational complexity.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

The present disclosure provides sampling-based objective quality assessment methods for meshes.

According to some embodiments, there is provided a method performed by at least one processor. The method includes receiving, at an encoder, a first polygonal mesh and a second polygonal mesh, the first polygonal mesh being an original polygonal mesh and the second polygonal mesh being a distorted polygonal mesh, each of the first and the second polygonal meshes comprising a plurality of polygon faces. The method further includes converting the first polygonal mesh and the second polygonal mesh into two or more triangle meshes by subdividing the plurality of polygon faces of each of the first polygonal mesh and the second polygonal mesh into a plurality of triangle faces, each triangle face corresponding to a respective triangle mesh of the two or more triangle meshes. The method further includes sampling a plurality of points on each of the plurality of triangle faces from both the first and the second polygonal meshes. The method further includes generating at least a first sampled point cloud for one of the first or the second polygonal mesh using the sampled plurality of points. The method further includes computing a geometry and attribute distortion profile between the first and the second polygonal meshes based on at least the first sampled point cloud.

According to some embodiments, an apparatus includes at least one memory configured to store program code and at least one processor configured to read the program code and operate as instructed by the program code. The program code includes receiving code configured to cause the at least one processor to receive, at an encoder, a first polygonal mesh and a second polygonal mesh, the first polygonal mesh being an original polygonal mesh and the second polygonal mesh being a distorted polygonal mesh, each of the first and the second polygonal meshes comprising a plurality of polygon faces. The program code further includes converting code configured to cause the at least one processor to convert the first polygonal mesh and the second polygonal mesh into two or more triangle meshes by subdividing the plurality of polygon faces of each of the first polygonal mesh and the second polygonal mesh into a plurality of triangle faces, each triangle face corresponding to a respective triangle mesh of the two or more triangle meshes. The program code further includes sampling code configured to cause the at least one processor to sample a plurality of points on each of the plurality of triangle faces from both the first and the second polygonal meshes. The program code further includes generating code configured to cause the at least one processor to generate at least a first sampled point cloud for one of the first or the second polygonal mesh using the sampled plurality of points. The program code further includes computing code configured to cause the at least one processor to compute a geometry and attribute distortion profile between the first and the second polygonal meshes based on at least the first sampled point cloud.

According to some embodiments, a non-transitory computer-readable storage medium, stores instructions that, when executed by at least one processor, cause the at least one processor to receive, at an encoder, a first polygonal mesh and a second polygonal mesh, the first polygonal mesh being an original polygonal mesh and the second polygonal mesh being a distorted polygonal mesh, each of the first and the second polygonal meshes comprising a plurality of polygon faces. The instructions further cause the at least one processor to convert the first polygonal mesh and the second polygonal mesh into two or more triangle meshes by subdividing the plurality of polygon faces of each of the first polygonal mesh and the second polygonal mesh into a plurality of triangle faces, each triangle face corresponding to a respective triangle mesh of the two or more triangle meshes. The instructions further cause the at least one processor to sample a plurality of points on each of the plurality of triangle faces from both the first and the second polygonal meshes. The instructions further cause the at least one processor to generate at least a first sampled point cloud for one of the first or the second polygonal mesh using the sampled plurality of points. The instructions further cause the at least one processor to compute a geometry and attribute distortion profile between the and the second polygonal meshes based on at least the first sampled point cloud.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

A mesh may include several polygons that describe the surface of a volumetric object. Its vertices in 3D space and the information of how the vertices are connected may define each polygon, referred to as connectivity information. Vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

The present disclosure provides sampling-based objective quality assessment methods for meshes. The quality metric used is based on MSE (mean squared error) or PSNR (peak signal to noise ratio). Similar methods can be extended to other quality metrics as well, such as SSIM, MS-SSIM, etc.

Figure 1:
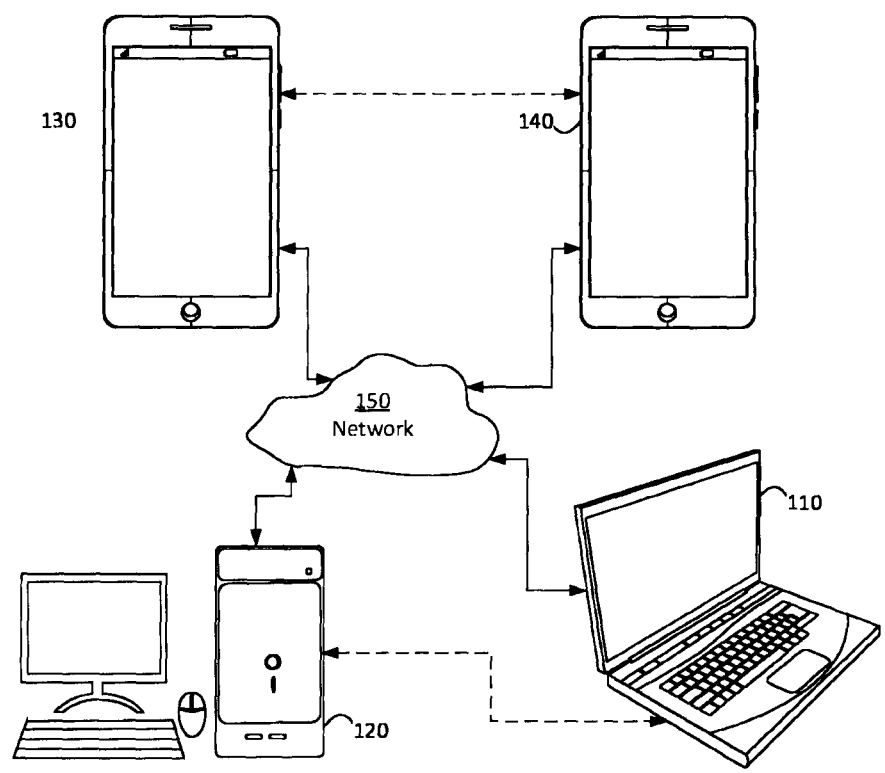
FIG. 1 is a schematic illustration of a simplified block diagram of a communication system, according to some embodiments.
Figure 2:
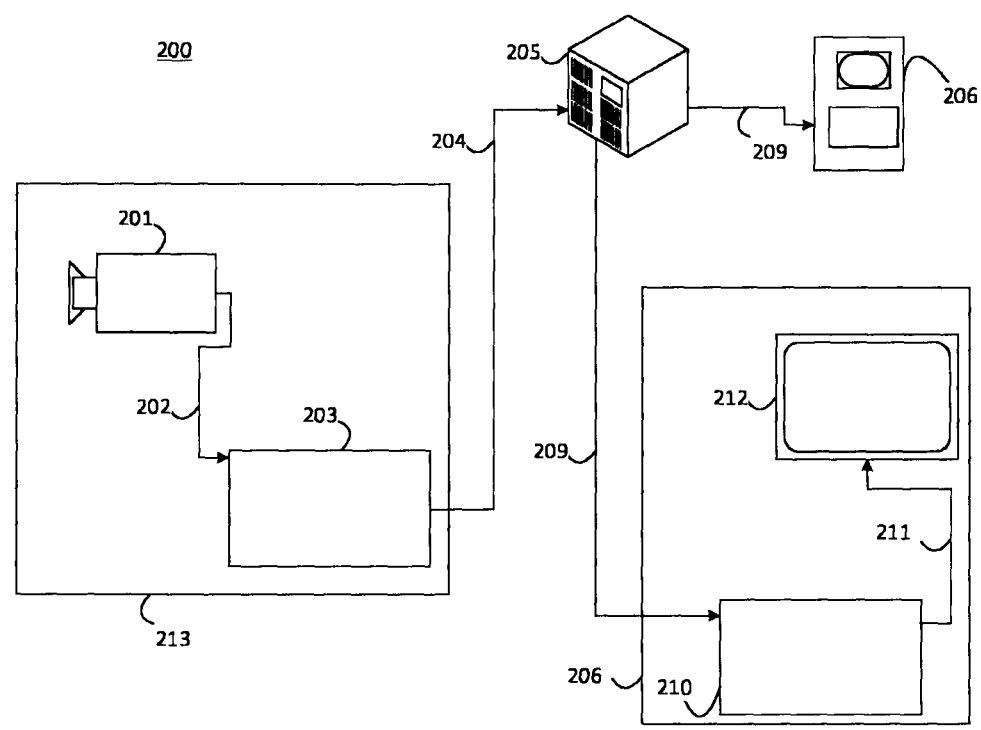
FIG. 2 is a schematic illustration of a simplified block diagram of a streaming system, according to some embodiments.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 can, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

In the MPEG CFP for dynamic mesh compression, it is proposed to use the point-based sampling metric to evaluate the quality of distorted triangle meshes.

Figure 3:
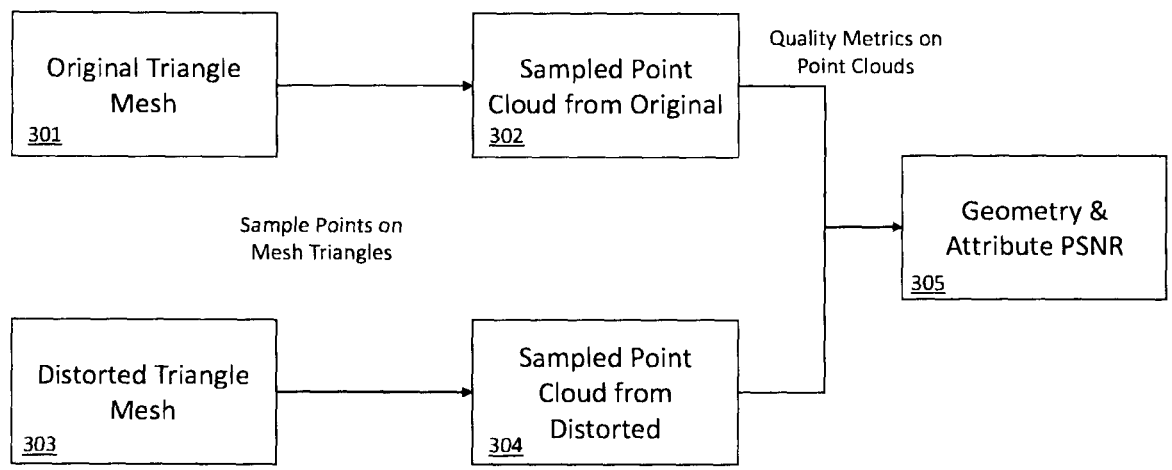
FIG. 3 is a framework of the objective quality evaluation for triangle meshes, according to some embodiments.

As shown in FIG. 3, the framework of the objective quality evaluation can be described as follows. First, both the original mesh 301 and distorted mesh 303 may be converted into point clouds 302 and 304 by sampling points on the mesh triangles. Then, the objective quality metrics for point clouds 302 and 304 may be applied to compute the geometry and attribute distortions 305 of the converted point clouds.

The point cloud may be created by performing ray-casting in the axis direction (x,y,z), depending on the normal of the triangle. A hit test determines if the casted ray hits the triangle, then the color is obtained by barycentric interpolation (to determine the UV coordinate of the point), and then bilinear interpolation (to get the RGB value from texture map).

The normal of the triangle may be computed as the cross product of its two edges and normalized to have a unit length. All the points obtained by sampling the triangle inherit its normal vector.

The Geometric Distortion Metrics may be used for evaluating the objective quality of the sampled point cloud from distorted mesh given the sampled point cloud from original mesh.

Let A and B denote the original and the compressed point cloud obtained from the sampling procedure described above, respectively. Consider evaluating the compression errors, denoted as $e_{B,A}$ in point cloud B relative to reference point cloud A. The steps to compute both point-to-point error (D1) and point-to-plane error (D2) for geometric errors are summarized in the following and illustrated in FIG. 5.

Figure 5:
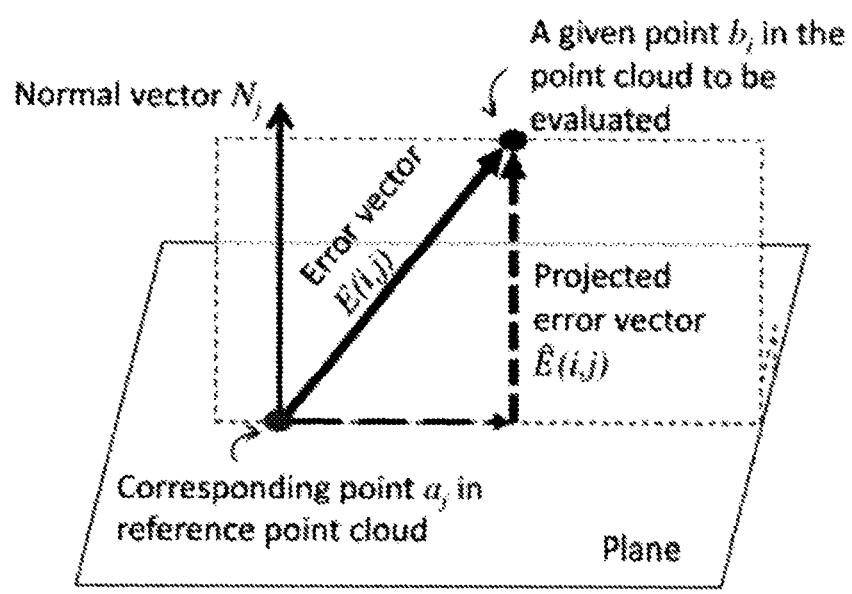
FIG. 5 is an illustration of point-to-point distance (D1) and point-to-plane distance (D2), according to some embodiments.

For each point $b_i$ in point cloud B, i.e., the black point in FIG. 5, identify a corresponding point $a_j$ in point cloud A, i.e., the red point in FIG. 5. Nearest neighbor is used to locate the corresponding point. In particular, a KD-tree search is used to perform the nearest neighbor search in order to reduce the computation complexity.

Determine an error vector E(i, j) by connecting the identified point $a_j$ in reference point cloud A to point $b_i$ in point cloud B. The length of the error vector is the point-to-point error, i.e., $$e_{B,A}^{D1}(i) = \|E(i,j)\|_2^2$$

Based on the point-to-point distances $e_{B,A}^{D1}(i)$ for all points $i \in B$, the point-to-point error (D1) for the whole point cloud, with $N_B$ as the number of points in point cloud B, is defined as:

$$e_{B,A}^{D1} = \frac{1}{N_B} \sum_{\forall b_i \in B} e_{B,A}^{D1}(i)$$

The D1 PSNR value is then computed as:

$$PSNR_{D1} = 10\log_{10}\left(\frac{3p^2}{e_{symm}^{D1}}\right),$$

where p is the maximum length of the sequence bounding box, and $e_{symm}^{D1}$ is the symmetric mean squared point-to-point ($e_{symm}^{D1}$) error, which are obtained as follows:

$$e_{symm}^{D1} = \max(e_{B,A}^{D1}, e_{A,B}^{D1}).$$

Project the error vector E(i, j) along the normal direction $N_j$ and get a new error vector $\hat{E}$(i, j). In this way, the point-to-plane error is computed as, $$e_{B,A}^{D2}(i) = \|\hat{E}(i,j)\|_2^2 = (E(i,j) \cdot N_j)^2.$$

The point-to-plane error (D2) for the whole point cloud is then defined as, $$e_{B,A}^{D2} = \frac{1}{N_B} \sum_{\forall b_i \in B} e_{B,A}^{D2}(i)$$

The D2 PSNR value is then computed as:

$$PSNR_{D2} = 10\log_{10}\left(\frac{3p^2}{e_{symm}^{D2}}\right),$$

where p is the maximum length of the sequence bounding box, and $e_{symm}^{D2}$ is the symmetric mean squared point-to-plane ($e_{symm}^{D2}$) error, which are obtained as follows:

$$e_{symm}^{D2} = \max(e_{B,A}^{D2}, e_{A,B}^{D2}).$$

The attribute PSNR can be computed as follows, $$PSNR_{Attr} = 10\log_{10}\left(\frac{p^2}{e_{symm}^{Attr}}\right),$$

where p is the maximum attribute value. $e_{symm}^{Attr}$ is the symmetric attribute error, which is calculated in the same way as geometric distortions as follows, $$e_{symm}^{Attr} = \max(e_{B,A}^{Attr}, e_{A,B}^{Attr}),$$

where $e_{B,A}^{Attr}$ is averaged attribute distortion for each point on B and its nearest point on A as follows, $$e_{B,A}^{Attr} = \frac{1}{N_B} \sum_{\forall b_i \in B} e_{B,A}^{Attr}(i).$$

For color attributes, the PSNR is calculated on YUV domain. A conversion from RGB space to YUV space is conducted using ITU-R BT.709. The peak value p for PSNR calculation is 255.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In this disclosure, a number of methods are proposed. The methods may be applied individually or by any form of combinations. It should be noted that the methods may be applied to both static meshes and dynamic meshes, where dynamic meshes may have time-varying geometry and attributes.

First, the method applied to triangle meshes may be extended to polygonal meshes. A polygonal mesh may have faces that have more than three edges. The framework according to some embodiments may be illustrated in FIG. 4A. In this case, the input original polygonal mesh 401 may be first converted to triangle meshes 406 by subdividing each of the polygons into triangles while maintaining the original face orientation. The same operations may be performed to convert distorted polygonal mesh 403 into distorted triangle meshes 407. Then, two sampled point clouds 402 and 404 are created, and quality metrics on the sampled point clouds 402 and 404 are used to compute geometry and attribute peak signal-to-noise ratio 405.

Specifically, a polygonal face may be represented by a sequence of vertices $(V_1, V_2, \ldots, V_n)$, where $n \geq 3$ is the degree (the number of edges) of the polygon. For example, n=3 for triangle faces, n=4 for quadrangle faces. A polygonal face with the degree of n may be subdivided into n−2 triangles. The subdivision of a polygonal face to triangle faces may be implemented in different ways.

Figure 6:
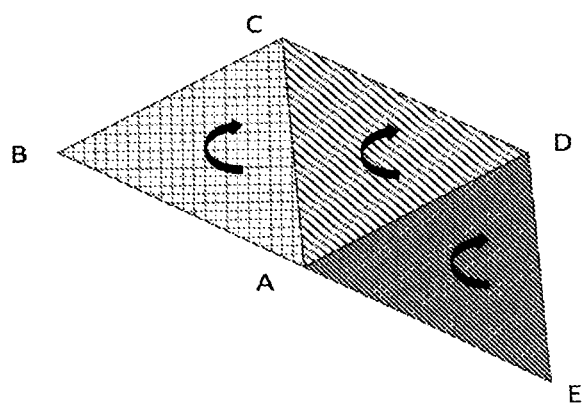
FIG. 6 is an illustration of subdividing a polygon into triangles, according to some embodiments.

In some embodiments, the subdivided triangles from the polygon may be written as $(V_1, V_2, V_3)$, $(V_1, V_3, V_4), \ldots, (V_1, V_{n-1}, V_n)$. For example, a quadrangle face with (A, B, C, D) may be divided into two triangles (A, B, C) and (A, C, D). A pentagon with (A, B, C, D, E) may be divided into three triangles (A, B, C), (A, C, D) and (A, D, E), as shown in FIG. 6.

In some embodiments, the subdivided triangles from the polygon (n is an even number) may be written as $(V_1, V_2, V_3)$, $(V_3, V_4, V_5), \ldots, (V_{n-1}, V_n, V_1)$ and further apply methods to subdivide the internal polygon $(V_1, V_3, V_5, \ldots)$ into triangles. Or, the subdivided triangles from the polygon (n is an odd number) may be written as $(V_1, V_2, V_3)$, $(V_3, V_4, V_5), \ldots, (V_{n-2}, V_{n-1}, V_n)$ and further apply methods to subdivide the internal polygon $(V_1, V_3, V_5, \ldots)$ into triangles. For example, a quadrangle face with (A, B, C, D) may be divided into two triangles (A, B, C) and (C, D, A). A pentagon with (A, B, C, D, E) may be divided into three triangles (A, B, C), (C, D, E) and (E, A, C).

Different sampling strategies may be applied to convert the triangle mesh into a point cloud.

In some embodiments, for each triangle on the mesh, the uniform sampling (given a sampling step as input parameter) may be applied on the 2D plane of the triangle.

Figure 7:
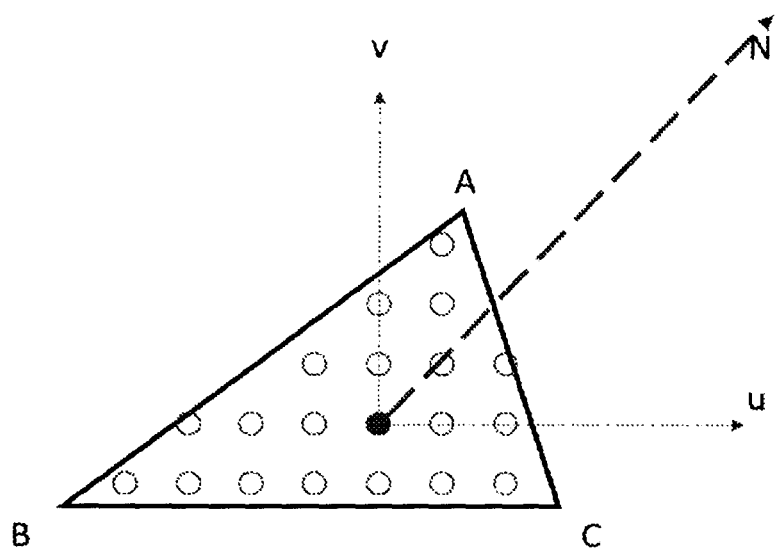
FIG. 7 is an illustration of uniform sampling in a triangle face, according to some embodiments.

As shown in FIG. 7, the triangle ABC is in 3D space, where each vertex is associated with the xyz coordinates. N is the normal vector of the triangle surface. The uniform sampling is applied on the 2D uv plane of the triangle face (which is orthogonal to the normal N). Specifically, the uniform sampling may be started from the origin and spread along uv axes on the 2D uv plane with the given sampling step. All the 2D sampling points that are inside the triangle will be collected. These 2D sampling points may be converted back to 3D world coordinates by inverse transform. The attribute values of the sampled points may be derived by different methods, e.g., barycentric based interpolation.

The origin position may be selected differently.

In one embodiment, the origin position is selected as the center of mass of the triangle (as illustrated in FIG. 7). In this case, it's guaranteed that there would be at least one sampling point, which is the center of mass, even if the sampling step is too large.

In another embodiment, the origin position is selected as one of the vertices.

In another embodiment, the origin position is selected as a point on the edge of the triangle.

The direction of uv axes may be set differently.

In one embodiment, the direction of u axis is selected to be parallel to one of the edges of the triangle. For example, in FIG. 7, the u axis is parallel to the edge BC.

Figure 4A:
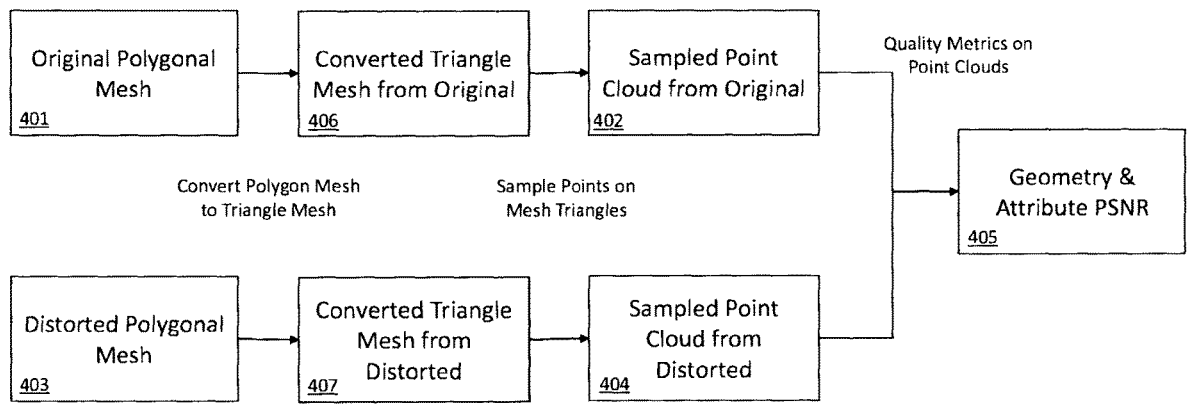
FIGS. 4A-C are various frameworks of the objective quality evaluation for polygonal meshes, according to some embodiments.
Figure 4B:
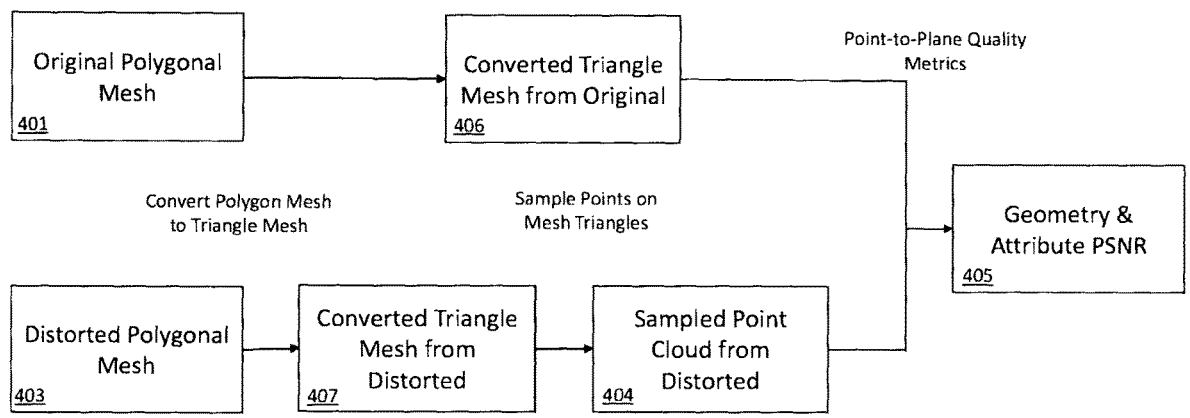
Figure 4C:
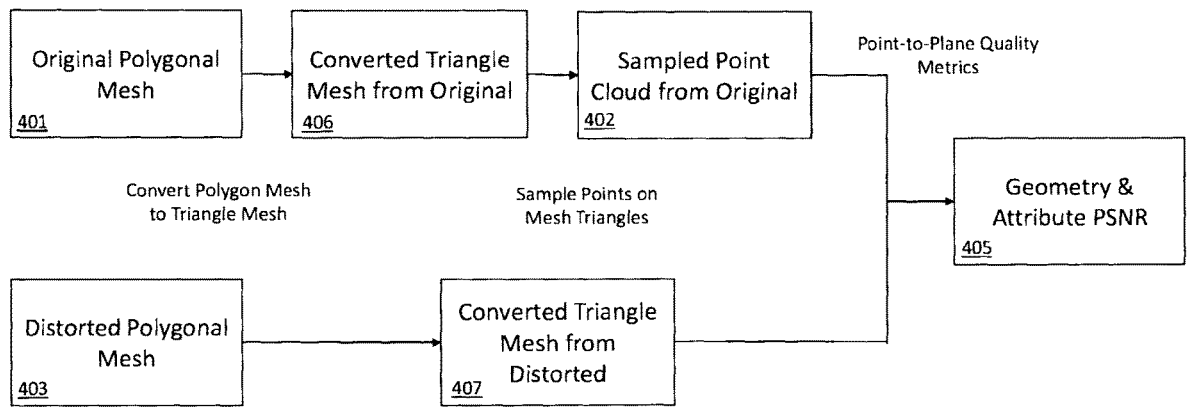

FIG. 4B and FIG. 4C show two examples of the point-to-plane based frameworks. The major difference from FIG. 4A is that one of the meshes, either the original 401 or distorted 403, is not sampled to point cloud. In these cases, only the point-to-plane D2 PSNR is computed. One may also use the symmetric point-to-plane D2 PSNR by taking the combination of FIG. 4B and FIG. 4C.

Take the framework in FIG. 4B as example, for each point on the sampled point cloud 404 (converted from the distorted mesh), one may find the closest triangle in the original mesh.

The geometry distortion may be computed by the distance from the sampled point to the closest triangle. The distance from a point to a triangle may be defined in different ways. In some embodiments, the distance is measured by the minimum distance, i.e., the length of the vector from the point to the orthogonal projection on that triangle.

The attribute distortion may be computed by the difference between the attribute value of the point and that of the orthogonal projection on the triangle. The attribute value of the orthogonal projection on the triangle may be estimated in different ways. In some embodiments, one may use the barycentric based interpolation.

Figure 8:
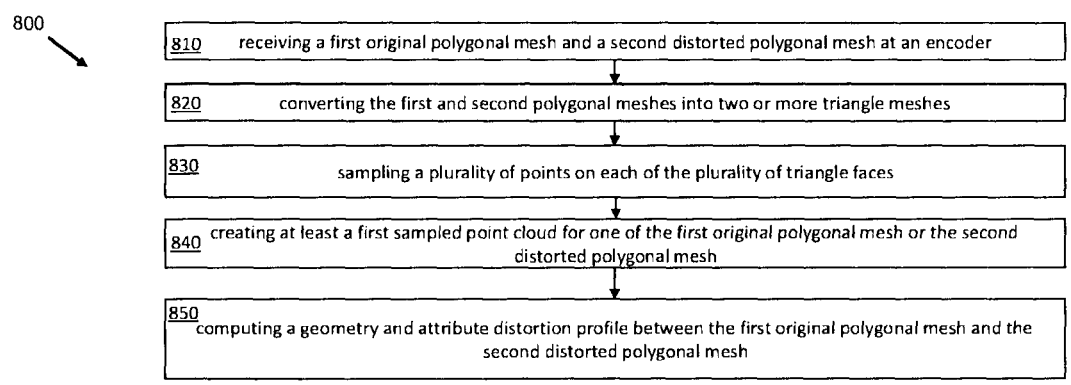
FIG. 8 is an operational flowchart illustrating the steps carried out by a program for sampling-based objective quality assessment methods for meshes, according to some embodiments.

FIG. 8 is a flowchart of example process 800 for sampling-based objective quality assessment methods for meshes. In some implementations, one or more process blocks of FIG. 8 may be performed by any of the elements discussed above.

As shown in FIG. 8, process 800 may include receiving a first original polygonal mesh and a second distorted polygonal mesh at an encoder, the first and second polygonal meshes each comprising a plurality of polygon faces (block 810).

As further shown in FIG. 8, the process 800 may include converting the first and second polygonal meshes into two or more triangle meshes by subdividing the plurality of polygon faces of each of the first and second polygonal meshes into a plurality of triangle faces (block 820).

As further shown in FIG. 8, the process 800 may include sampling a plurality of points on each of the plurality of triangle faces from both the first original polygonal mesh and the second distorted polygonal mesh (block 830).

As further shown in FIG. 8, the process 800 may include creating at least a first sampled point cloud for one of the first original polygonal mesh or the second distorted polygonal mesh using the plurality of sampled points (block 840).

As further shown in FIG. 8, the process 800 may include computing a geometry and attribute distortion profile between the first original polygonal mesh and the second distorted polygonal mesh based on at least the first sampled point cloud (block 850).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The techniques, described above, may be implemented as computer software using computer-readable instructions and physically stored in one or more computer-readable media. For example, FIG. 9 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
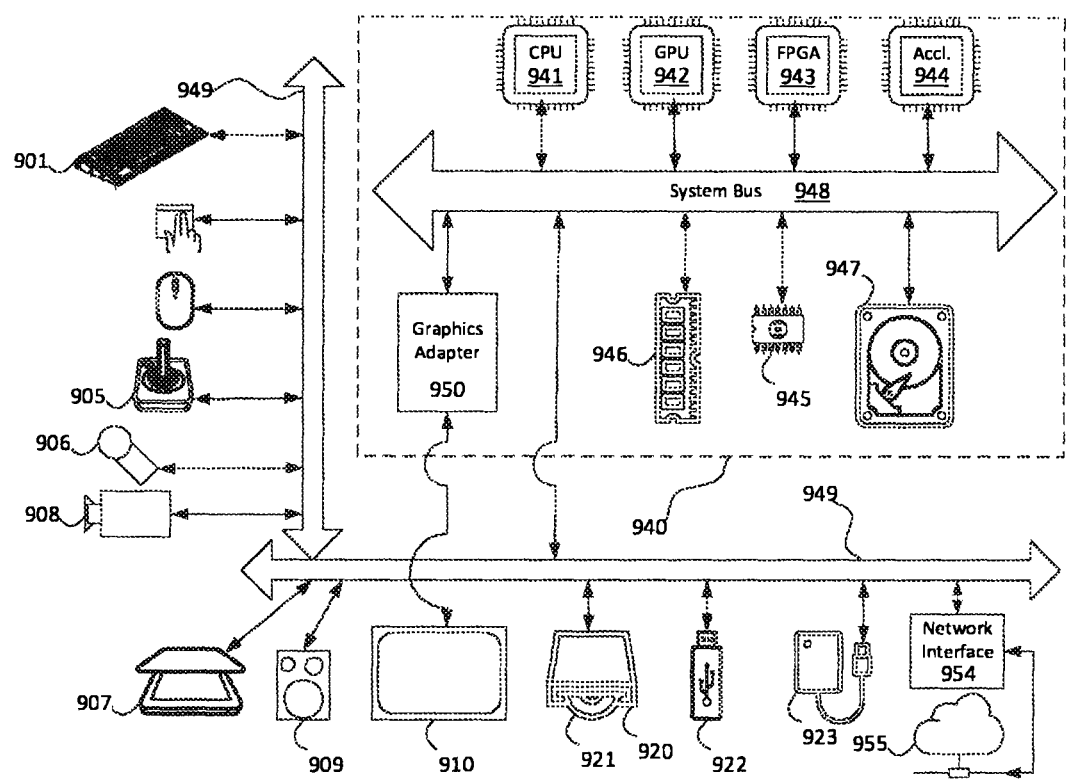
FIG. 9 is a diagram of a computer system suitable for implementing embodiments.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 900, and specifically the core 940 may provide functionality as a result of processor(s)

(including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
   receiving, at an encoder, a first polygonal mesh and a second polygonal mesh, the first polygonal mesh being an original polygonal mesh and the second polygonal mesh being a distorted polygonal mesh, each of the first and the second polygonal meshes comprising a plurality of polygon faces;
   converting the first polygonal mesh and the second polygonal mesh into two or more triangle meshes by subdividing the plurality of polygon faces of each of the first polygonal mesh and the second polygonal mesh into a plurality of triangle faces, each triangle face corresponding to a respective triangle mesh of the two or more triangle meshes;
   sampling a plurality of points on each of the plurality of triangle faces from both the first and the second polygonal meshes;
   generating at least a first sampled point cloud for one of the first or the second polygonal mesh using the sampled plurality of points; and
   computing a geometry and attribute distortion profile between the first and the second polygonal meshes based on at least the first sampled point cloud.

2. The method of claim 1, wherein the sampling the plurality of points on a respective triangle face from the plurality of triangle faces begins at an origin point and spreads along UV axes on a 2D UV plane.

3. The method of claim 2, wherein the origin point is selected as a center of mass of the respective triangle face from the plurality of triangle faces.

4. The method of claim 2, wherein the origin point is selected as one of a plurality of vertices on the respective triangle face from the plurality of triangle faces.

5. The method of claim 2, wherein the origin point is selected as a point on an edge of the respective triangle face from the plurality of triangle faces.

6. The method of claim 2, wherein a direction of a U axis is selected to be parallel to one of a plurality of edges of the respective triangle face from the plurality of triangle faces.

7. The method of claim 1, wherein the geometry and attribute distortion profile is based on one of either mean squared error or peak signal to noise ratio.

8. The method of claim 1, wherein computing the geometry and attribute distortion profile further comprises:
   generating a second sampled point cloud for either the other of the first polygonal mesh or the second polygonal mesh using the sampled plurality of points; and
   determining one or more characteristics of the second sampled point cloud based on the first sampled point cloud.

9. The method of claim 8, wherein the computing the geometry and attribute distortion profile between the first and the second polygonal meshes is further based on the determined one or more characteristics.

10. An apparatus comprising:
    at least one memory configured to store program code; and
    at least one processor configured to read the program code and operate as instructed by the program code, the program code comprising:
    receiving code configured to cause the at least one processor to receive, at an encoder, a first polygonal mesh and a second polygonal mesh, the first polygonal mesh being an original polygonal mesh and the second polygonal mesh being a distorted polygonal mesh, each of the first and the second polygonal meshes comprising a plurality of polygon faces;
    converting code configured to cause the at least one processor to convert the first polygonal mesh and the second polygonal mesh into two or more triangle meshes by subdividing the plurality of polygon faces of each of the first polygonal mesh and the second polygonal mesh into a plurality of triangle faces, each triangle face corresponding to a respective triangle mesh of the two or more triangle meshes;
    sampling code configured to cause the at least one processor to sample a plurality of points on each of the plurality of triangle faces from both the first and the second polygonal meshes;
    generating code configured to cause the at least one processor to generate at least a first sampled point cloud for one of the first or the second polygonal mesh using the sampled plurality of points; and
    computing code configured to cause the at least one processor to compute a geometry and attribute distortion profile between the first and the second polygonal meshes based on at least the first sampled point cloud.

11. The apparatus according to claim 10, wherein the sampling the plurality of points on a respective triangle face from the plurality of triangle faces begins at an origin point and spreads along UV axes on a 2D UV plane.

12. The apparatus according to claim 11, wherein the origin point is selected as a center of mass of the respective triangle face from the plurality of triangle faces.

13. The apparatus according to claim 11, wherein the origin point is selected as one of a plurality of vertices on the respective triangle face from the plurality of triangle faces.

14. The apparatus according to claim 11, wherein the origin point is selected as a point on an edge of the respective triangle face from the plurality of triangle faces.

15. The apparatus according to claim 11, wherein a direction of a U axis is selected to be parallel to one of a plurality of edges of the respective triangle face from the plurality of triangle faces.

16. The apparatus according to claim 10, wherein the geometry and attribute distortion profile is based on one of either mean squared error or peak signal to noise ratio.

17. The apparatus according to claim 10, wherein the computing code further causes the at least one processor to:
generate a second sampled point cloud for either the other of the first polygonal mesh and the second polygonal mesh using the sampled plurality of points; and
determine one or more characteristics of the second sampled point cloud based on the first sampled point cloud.

18. The apparatus according to claim 17, wherein the computing the geometry and attribute distortion profile between the first and the second polygonal meshes is further based on the determined one or more characteristics.

19. A non-transitory computer-readable storage medium, storing instructions, which, when executed by at least one processor, cause the at least one processor to:
receive, at an encoder, a first polygonal mesh and a second polygonal mesh, the first polygonal mesh being an original polygonal mesh and the second polygonal mesh being a distorted polygonal mesh, each of the first and the second polygonal meshes comprising a plurality of polygon faces;
convert the first polygonal mesh and the second polygonal mesh into two or more triangle meshes by subdividing the plurality of polygon faces of each of the first polygonal mesh and the second polygonal mesh into a plurality of triangle faces, each triangle face corresponding to a respective triangle mesh of the two or more triangle meshes;
sample a plurality of points on each of the plurality of triangle faces from both the first and the second polygonal meshes;
generate at least a first sampled point cloud for one of the first or the second polygonal mesh using the sampled plurality of points; and
compute a geometry and attribute distortion profile between the and the second polygonal meshes based on at least the first sampled point cloud.

20. The non-transitory computer-readable storage medium according to claim 19, wherein the sampling the plurality of points on a respective triangle face from the plurality of triangle faces begins at an origin point and spreads along UV axes on a 2D UV plane.

* * * * *